United States Patent [19]
Narasimhan

[11] Patent Number: 4,565,587
[45] Date of Patent: Jan. 21, 1986

[54] PERMANENT MAGNET ALLOY

[75] Inventor: Kalatur S. V. L. Narasimhan, Monroeville, Pa.

[73] Assignee: Crucible Materials Corporation, Pittsburgh, Pa.

[21] Appl. No.: 564,667

[22] Filed: Dec. 23, 1983

Related U.S. Application Data

[63] Continuation-in-part of Ser. No. 468,903, Feb. 23, 1983, abandoned.

[51] Int. Cl.[4] .............................................. C04B 35/00
[52] U.S. Cl. ................................ 148/31.57; 420/435; 420/582
[58] Field of Search ..................... 148/31.57; 420/435, 420/582; 75/228, 230

[56] References Cited

U.S. PATENT DOCUMENTS 4,210,471 7/1980 Yoneyama et al. ................ 148/102
4,213,802 7/1982 Rothwarf et al. .................. 148/101
4,369,075 1/1983 Nobuo et al. ...................... 148/103

FOREIGN PATENT DOCUMENTS 55-6481 1/1980 Japan .................................. 148/104
56-156735 12/1981 Japan ............................... 148/31.57
57-100705 6/1982 Japan ............................... 148/31.57

*Primary Examiner*—John P. Sheehan
*Attorney, Agent, or Firm*—Finnegan, Henderson, Farrabow, Garrett & Dunner

[57] ABSTRACT

A permanent magnet of $R_2Co_{17}$ type crystal structure consisting essentially of, in percent by weight, at least one rare earth element within the range of 24 to 28, cobalt within the range of 48 to 53, copper within the range of 2 to 4.9, iron within the range of 18 to 30 and zirconium within the range of 1.7 to 3.0. By substituting zirconium for a portion of copper an optimum combination of coercive force and residual magnetization (saturation induction) may be achieved.

2 Claims, No Drawings

PERMANENT MAGNET ALLOY

This is a continuation-in-part of patent application Ser. No. 468,903, filed Feb. 23, 1983 now abandoned.

It is known in the production of rare earth-cobalt permanent magnets (R-Co) that iron may be used to replace a significant portion of the cobalt when zirconium is added to the composition. It is also known that additions of copper may be made to compositions of this type. However, with a copper addition the residual magnetization (saturation induction) is decreased. Likewise, as iron is increased there is a corresponding reduction in coercive force.

It is accordingly a primary object of the present invention to provide a permanent magnet alloy containing samarium, cobalt, iron and copper wherein an optimum combination of coercive force and residual magnetization is achieved.

A more specific object of the invention is to provide a permanent magnet alloy of this type wherein copper is reduced and replaced by a zirconium addition, whereby an optimum combination of coercive force and residual magnetization may be achieved.

These and other objects of the invention, as well as a more complete understanding thereof, may be obtained from the following description and specific examples:

Broadly in the practice of the invention the permanent magnet is of an alloy of the general formula $R_2Co_{17}$ wherein R is samarium and the Co component is cobalt. The alloy, in weight percent, consists essentially of samarium within the range of 26 to 28, cobalt with the range of 48 to 53, copper within the range of 2 to less than 4, iron within the range of 21 to 30 and zirconium within the range of 1.7 to 3.0. By maintaining copper at an amount less than 4% and adding zirconium within the above stated range, the adverse affect of copper with regard to residual magnetization is eliminated and thus an optimum combination of coercive force and residual magnetization is achieved.

As specific examples of the practice of the invention the following alloy compositions were employed:

| Alloy | Weight, Percent* | | | | |
|---|---|---|---|---|---|
| | Sm | Co | Cu | Fe | Zr |
| A | 25.6 | 49.9 | 3.8 | 18.6 | 1.7 |
| B | 25.1 | 48.7 | 3.9 | 19.7 | 2.6 |
| Commercial Alloy | 26.6 | 50.4 | 5.9 | 14.7 | 2.4 |

*Analysis to ± about 5%

The alloys were produced by induction melting and casting, whereupon they were then crushed and ball milled to a particle size within the range of 5 to 10 microns. The powder was then oriented in a magnetic field and samples thereof were both pressed by a pulsating magnetic field in combination with hot isostatic pressing and also by die pressing in a transverse magnetic field. Thereafter, the magnets were heat treated at 1200° C. for 1 hour, cooled for 2 hours to 1150° C. and held at this temperature for 5 hours, quenched, and then heated to 850° C. and aged for 17 hours, cooled for 13 hours to 400° C., held at 400° C. for 1 hour to 10 hours, and then quenched.

Hysteresis loops were measured on these magnets and the results are set forth in TABLE I.

TABLE I

EFFECT OF MAGNETIZING FIELD ON THE REMANENCE* AND INTRINSIC COERCIVE FORCE ON ALLOY B

| Magnetizing Field Strength Oe | $B_r$ G | $H_{ci}$ Oe |
|---|---|---|
| 3,000 | 4,000 | 5,400 |
| 6,500 | 8,500 | 8,200 |
| 10,600 | 9,700 | 9,300 |
| 15,000 | 10,400 | 10,500 |
| ~60,000 | 10,800 | 10,700 |

*Max value for saturation $B_s$ = 11,300 G measured at 16 kOe.

For the above alloy so processed TABLE II shows a comparison between ball milled powder and jet milled powder on the magnet properties of transversed die pressed blocks.

TABLE II

COMPARATIVE EVALUATION OF BALL MILLED AND JET MILLED POWDER ON ALLOY B AND COMMERCIAL ALLOY*

| | $B_r$ G | $H_{ci}$ Oe | Alloy |
|---|---|---|---|
| Ball Milled Powder | 9,900 | 8,600 | B |
| Jet Milled Powder | 10,600 | 10,100 | B |
| Ball Milled Powder | 9,600 | 9,000 | Commercial |
| Jet Milled Powder | 10,250 | 9,300 | Commercial |

*Commercial alloy with 26.6 Sm, 50.4 Co, 14.7 Fe, 5.9 Cu, 2.4 Zr

TABLE III shows that cold isostatic pressing produces higher remanence than the transverse die pressed blocks.

TABLE III

COMPARISON OF TRANSVERSE DIE BLOCKS AND ISOSTATICALLY PRESSED SAMPLES

| | $B_r$ G | $H_{ci}$ Oe | Alloy |
|---|---|---|---|
| Transverse Die Pressing | 10,600 | 10,100 | B |
| Isostatic Pressing | 10,800+ | 10,700+ | B |
| Transverse Pressing | 10,250 | 9,300 | Commercial |
| Isostatic Pressing | 10,550 | 7,900+ | Commercial |

TABLE IV shows the effect of heat treatment on the magnetic properties of the tested magnets.

TABLE IV

| Alloy | $B_r$ G | $H_c$ Oe | $H_{ci}$ Oe | $BH_{max}$ MGOe |
|---|---|---|---|---|
| A | 10,000 | 7,300 | 10,200 | 22.4 |
| A | 10,950 | 7,900 | 11,450 | 27.5 |
| B | 10,950 | 8,350 | 17,950 | 24.0 |

An alloy of the composition 26.0 samarium, 49.0 cobalt, 3.9 copper, 19.2 iron, 2.5 zirconium, closely similar in composition to Alloy B, was jet milled and die pressed with the applied field in the same direction as the pressing direction. These magnets were solution treated over a temperature range of 1080 to 1180 for five hours and aged at different temperatures as indicated in TABLES V through VII.

TABLE V

MAGNETIC PROPERTIES OF THE ALLOY AGED AT 850° C. - 17 HRS $\xrightarrow{\text{13 HRS COOL}}$ 400° C. - 2 HRS

| Solution Treat Temperature | $B_r$ G | $H_c$ Oe | $H_{ci}$ Oe | $BH_{max}$ MGOe |
|---|---|---|---|---|
| 1180 | 9,500 | 7,570 | 17,320 | 18.5 |
| 1160 | 9,750 | 7,080 | 14,450 | 19.3 |
| 1120 | 9,670 | 5,800 | 11,450 | 15.3 |

TABLE VI

MAGNETIC PROPERTIES OF THE ALLOY AGED AT 820° C. - 17 HRS $\xrightarrow{\text{13 HRS COOL}}$ 400° C. - 2 HRS

| Solution Treat Temperature | $B_r$ G | $H_c$ Oe | $H_{ci}$ Oe | $BH_{max}$ MGOe |
|---|---|---|---|---|
| 1180 | 10,170 | 7,850 | 14,150 | 21 |
| 1160 | 9,575 | 6,630 | 12,500 | 18 |
| 1140 | 9,500 | 6,600 | 11,600 | 16.4 |
| 1120 | 9,800 | 5,800 | 7,500 | 17.5 |

TABLE VII

MAGNETIC PROPERTIES OF THE ALLOY AGED AT 780° C. - 17 HRS $\xrightarrow{\text{13 HRS COOL}}$ 400° C. - 2 HRS

| Solution Treat Temperature | $B_r$ G | $H_c$ Oe | $H_{ci}$ Oe | $BH_{max}$ MGOe |
|---|---|---|---|---|
| 1180 | 10,000 | 4,100 | 5,000 | 16.2 |
| 1160 | 9,650 | 3,630 | 4,250 | 13.2 |
| 1140 | 9,350 | 3,100 | 3,800 | 10.2 |
| 1120 | 8,500 | 2,350 | 2,650 | — |

This same alloy composition was jet milled and die pressed with the applied field perpendicular to the pressing direction. These magnets were solution heat treated at 1180 or 1150 and aged at 850° C. The magnetic properties obtained are shown in TABLE VIII.

TABLE VIII

MAGNETIC PROPERTIES OF TRANSVERSE PRESSED MAGNETS SOLUTION TREATED AT TWO DIFFERENT TEMPERATURES

| Solution Treat Temperature | $B_r$ G | $H_c$ Oe | $H_{ci}$ Oe | $BH_{max}$ MGOe |
|---|---|---|---|---|
| 1180 | 10,600 | 8,100 | 14,200 | 24.3 |
| 1150 | 10,550 | 7,300 | 12,320 | 23.0 |

As may be seen from these specific examples, the desired combination of coercive force and residual magnetization may be obtained by continuous cooling after the aging treatment.

Alloy B of TABLE IV was die pressed and heat treated, which heat treatment included aging for six hours at 850° C. and thereafter continuously cooling. The magnetic properties are set forth in TABLE IX.

TABLE IX

| Alloy | $B_r$ G | $H_c$ Oe | $H_{ci}$ Oe | $BH_{max}$ MGOe |
|---|---|---|---|---|
| B | 10,600 | 8,100 | 14,200 | 24.3 |

As may be seen from TABLE IX the magnetic properties are maintained by a combination of relatively short-time aging followed by continuous cooling.

I claim:

1. A permanent magnet of $R_2Co_{17}$ type crystal structure consisting essentially of in percent by weight samarium 25.1, cobalt 48.7, copper 3.9, iron 19.7 and zirconium 2.6, said magnet having been formed by cold isostatic pressing.

2. The permanent magnet of claim 1 wherein said magnet has been aged for 6 to 17 hours and thereafter continuously cooled prior to quenching.

* * * * *